United States Patent
Schneider et al.

(10) Patent No.: US 8,457,839 B2
(45) Date of Patent: Jun. 4, 2013

(54) MULTI-DISPLAY VEHICLE INFORMATION SYSTEM AND METHOD

(75) Inventors: Mark Schneider, Northville, MI (US); Jason Johnson, Dearborn, MI (US); Jennifer L. Brace, Northville, MI (US); Ivette Hernandez, Dearborn, MI (US); Alexander Struthers, Northville, MI (US); Karl Vandivier, Belleville, MI (US); Amy Garby, Canton, MI (US); Paul Aldighieri, Grosse Pointe Farms, MI (US); Gary Braddock, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 12/854,016

(22) Filed: Aug. 10, 2010

(65) Prior Publication Data
US 2011/0166748 A1    Jul. 7, 2011

Related U.S. Application Data

(60) Provisional application No. 61/293,190, filed on Jan. 7, 2010.

(51) Int. Cl.
*G06F 7/00* (2006.01)
(52) U.S. Cl.
USPC .......................................................... 701/36
(58) Field of Classification Search
USPC .......................................................... 701/36
See application file for complete search history.

(56) References Cited

U.S. PATENT DOCUMENTS

| | | | |
|---|---|---|---|
| 6,539,078 B1 | 3/2003 | Hunt et al. | |
| 6,668,221 B2 | 12/2003 | Harter, Jr. et al. | |
| 6,842,677 B2 * | 1/2005 | Pathare | 701/36 |
| 6,903,652 B2 * | 6/2005 | Noguchi et al. | 340/425.5 |
| 7,194,069 B1 | 3/2007 | Jones et al. | |
| 7,246,062 B2 | 7/2007 | Knott et al. | |
| 7,337,113 B2 | 2/2008 | Nakagawa et al. | |
| 7,565,230 B2 | 7/2009 | Gardner et al. | |
| 7,783,475 B2 | 8/2010 | Neuberger et al. | |
| 7,826,945 B2 | 11/2010 | Zhang et al. | |
| 8,116,437 B2 | 2/2012 | Stillman et al. | |
| 2003/0004730 A1 | 1/2003 | Yuschik | |
| 2003/0055643 A1 | 3/2003 | Woestemeyer et al. | |
| 2003/0099335 A1 | 5/2003 | Tanaka et al. | |
| 2003/0220725 A1 | 11/2003 | Harter, Jr. et al. | |
| 2004/0176906 A1 | 9/2004 | Matsubara et al. | |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Michael McCullough
(74) *Attorney, Agent, or Firm* — Jennifer M. Stec; Brooks Kushman P.C.

(57) ABSTRACT

Embodiments of the present invention include a vehicle human machine interface (HMI) for control by a vehicle occupant. The HMI may include a first graphical display, a second graphical display, a plurality of input controls, and a vehicle computer communicating with the first and second graphical displays. The vehicle computer may be configured to receive user input defining user instructions for controlling one or more functions of the vehicle. In response to the input, the computer may be configured to present on the first and second graphical displays a vehicle function identifier color associated with the vehicle function.

16 Claims, 5 Drawing Sheets

U.S. PATENT DOCUMENTS

| | | | |
|---|---|---|---|
| 2005/0125110 A1 | 6/2005 | Potter et al. |
| 2006/0142917 A1 | 6/2006 | Goudy |
| 2007/0072616 A1 | 3/2007 | Irani |
| 2007/0255568 A1 | 11/2007 | Pennock |
| 2008/0070616 A1 | 3/2008 | Yun |
| 2009/0275281 A1 | 11/2009 | Rosen |
| 2010/0191535 A1 | 7/2010 | Berry et al. |
| 2010/0210254 A1 | 8/2010 | Kelly et al. |
| 2010/0233959 A1 | 9/2010 | Kelly et al. |
| 2011/0009107 A1 | 1/2011 | Guba et al. |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

* cited by examiner

MULTI-DISPLAY VEHICLE INFORMATION SYSTEM AND METHOD

CROSS-REFERENCE TO RELATED APPLICATIONS

This application claims the benefit of U.S. provisional Application No. 61/293,190 filed Jan. 7, 2010, the disclosure of which is incorporated in its entirety by reference herein.

BACKGROUND

1. Technical Field

Various embodiments relate to a user-interactive vehicle information display system. The display system may comprise multiple displays and, in some embodiments, include a touchscreen. The system may be used to operate multiple functions within a vehicle.

2. Background Art

Many vehicles today include a vehicle computing system which can include a range of different functions for a vehicle occupant's use. Many share common features like a touchscreen display, navigation, and hands free voice communication. Some OEMs add additional features to distinguish the brand from others. These features may vary from brand to brand.

One such OEM that offers a vehicle-based computing system is THE FORD MOTOR COMPANY which manufactures the SYNC system.

SUMMARY

Embodiments of the present invention include a vehicle human machine interface (HMI) for control by a vehicle occupant. The HMI may include a first graphical display, a second graphical display, a plurality of input controls, and a vehicle computer communicating with the first and second graphical displays. The vehicle computer may be configured to receive user input defining user instructions for controlling one or more functions of the vehicle. In response to the input, the computer may be configured to present on the first and second graphical displays a vehicle function identifier color associated with the vehicle function.

In some embodiments, the first and second graphical display may display similar functions, each having a similar function identifier color. In other embodiments, the color identifier displayed on the first and second displays may be the same.

The HMI of graphical display may include a touchscreen configured to receive user input. The touchscreen may include corners, each corner displaying a different vehicle function and associated identifier color. The computer may be configured to present the vehicle function identifier color on the first or second graphical display in response to user input.

In a different embodiment, one or more of the graphical displays includes four corners, each corner including an input region corresponding to a different vehicle function. In one example, the four corners correspond to four functions including climate control, communication, entertainment and navigation.

Another embodiment of the present invention includes a method for operating one or more functions of the vehicle. The method includes receiving a first input defining user instructions for controlling one or more functions of the vehicle. The input may be received from one or more touchscreen inputs on a first graphical display located in proximity to one or more corners of the first graphical display. The method further includes receiving a second input from a second input device defining information to display on a second graphical display. In response to the first input, a first vehicle function identifier color associated with the vehicle function is presented on the first graphical display. In response to the second input, the second vehicle function identifier color associated with displayed information is presented on the second graphical display. The identifier colors displayed on the first and second displays may be the same color.

The first and second displays may include a bezel defining a boundary for receiving user input at the touchscreen.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

User interaction by a vehicle occupant with current vehicle computing systems can sometimes be cumbersome. For example, "core" controls, e.g., controls that are most commonly used, may not always be easily found and/or accessible. As another example, the display may present items in such a manner that the vehicle occupant may need to look at the display to select an operation. At times, this may even lead to activating an unintended control. Additionally, many vehicles are only equipped with one display, usually located in the center stack.

It should be understood that the use of the term "core" controls or "core" operations is not limiting. The use of the term is for clarity and illustration.

Figure 1:
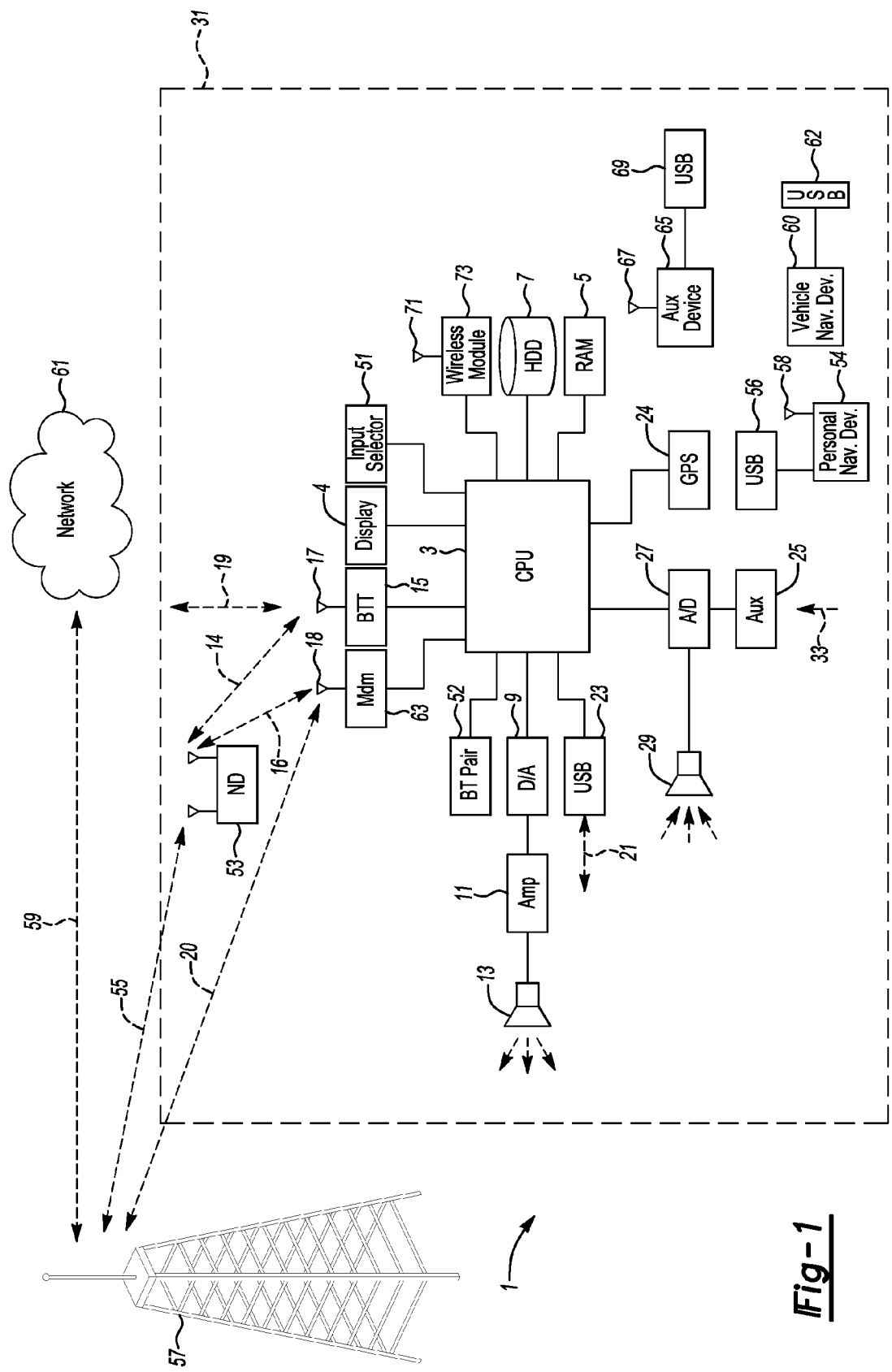
FIG. 1 is an exemplary block topology of a vehicle infotainment system implementing a user-interactive vehicle information display system.

FIG. 1 illustrates an example block topology for a vehicle based computing system 1 for a vehicle 31. The illustrative topology may be used in conjunction with, and support, the various embodiments described below. An example of such a vehicle-based computing system 1 is the SYNC system manufactured by THE FORD MOTOR COMPANY.

A vehicle enabled with a vehicle-based computing system (VCS) may contain a visual front end interface 4 located in the vehicle. The user may also be able to interact with the interface if it is provided, for example, with a touch sensitive screen. Further details of this touch sensitive screen are provided below. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7.

In this illustrative embodiment, the non-persistent storage is random access memory (RAM) and the persistent storage is a hard disk drive (HDD) or flash memory. Furthermore, a main operating system (e.g., a WinCE based OS or the MICROSOFT AUTO platform) may run on the processor 3. As described in further details below with respect to FIG. 3, the processor 3 may be responsible for all infotainment related processing such as audio, video, speech, and the like. The processor 3 may also interface with other infotainment components via, e.g., IDB 1394 as well as analog and digital I/O. A vehicle microcontroller (not shown) may interface with the processor 3 to permit access to the vehicle network (e.g., and without limitation, CAN). In one embodiment, the vehicle computing system 1 may implement a plurality of vehicle network nodes (e.g., a private CAN network, a high speed network, and a medium speed network).

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. In one embodiment, there may be at least two visual displays. For example, and without limitation, the vehicle computing system 1 may include a display in the center stack and one or more displays in the instrument cluster. These displays may share an identical hardware interface and may comprise of different clock speeds. All, or at least one, of these displays may be touch screen.

The speaker may be connected to an amplifier 11 and receives its signal from the processor 3 through a digital-to-analog converter 9. Output can also be made to a remote BlueTooth device such as PND 54 or a USB device such as vehicle navigation device 60 along the bi-directional data streams shown at 19 and 21 respectively.

In one embodiment, the vehicle computing system 1 may also support video output and input interfaces (not shown). The video inputs may be used for (without limitation) rear view camera, auxiliary video input, and DVD players.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53.

Alternatively, it may be desirable to include an onboard modem 63 in order to transfer data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31. In yet another embodiment, the ND 53 may be a wireless local area network (LAN) device capable of communication over, for example (and without limitation), an 802.11 g network (i.e., WiFi) or a WiMax network.

In one embodiment, incoming data can be passed through the nomadic device via a data-over-voice or data-plan, through the onboard BlueTooth transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Figure 2:
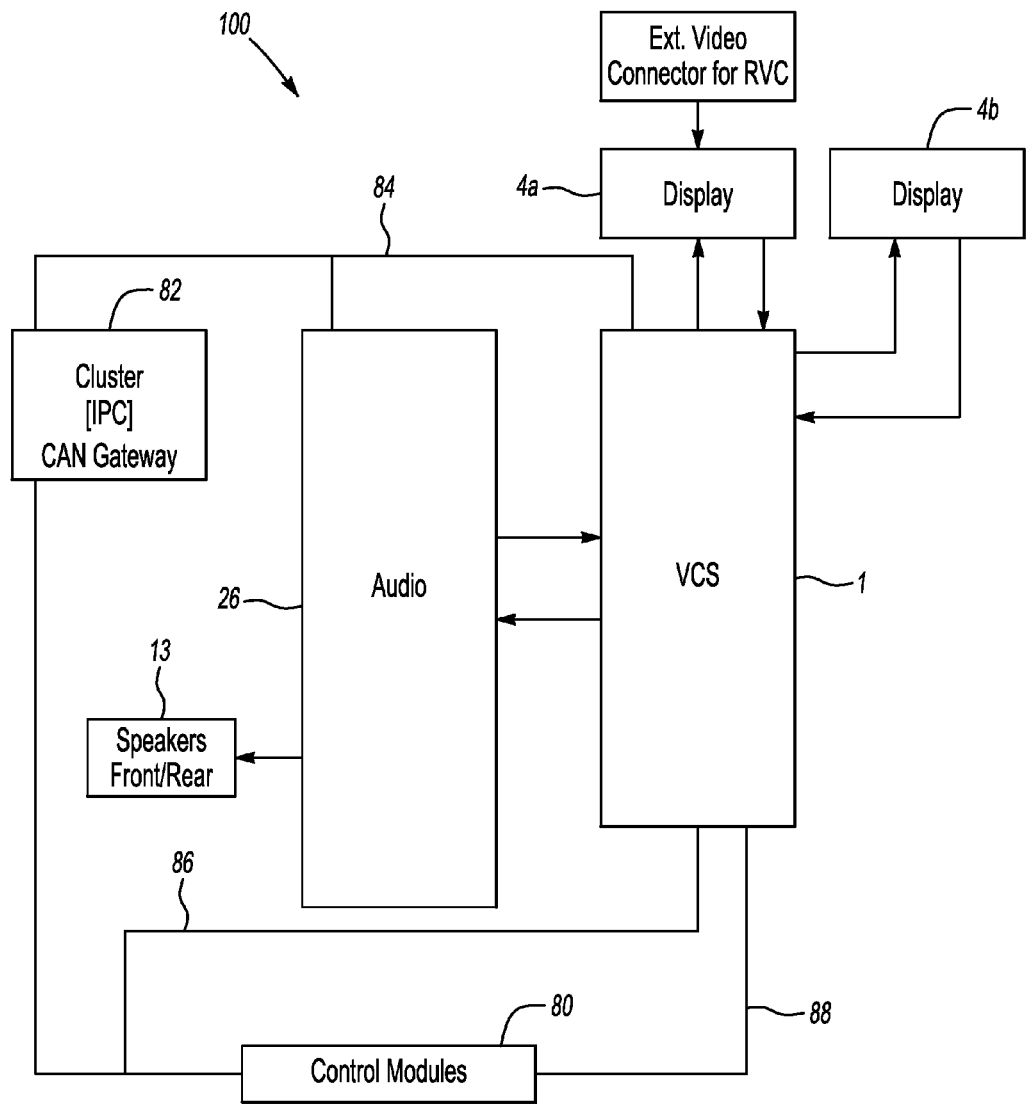
FIG. 2 is a block system architecture of a vehicle computing system having a user-interactive information display system.
Figure 3:
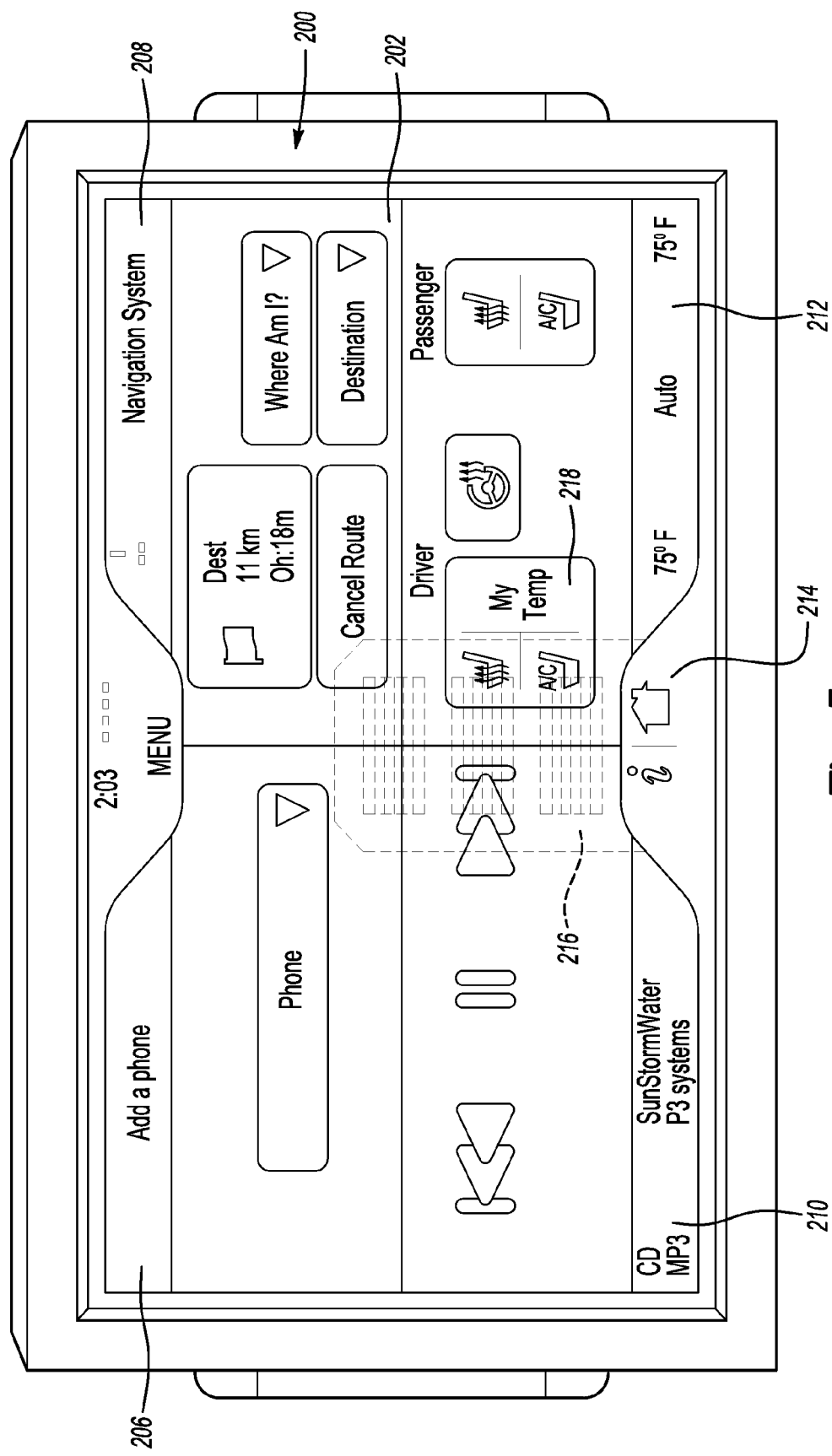
FIG. 3 is an illustration of one display of the user-interactive information display system according to one embodiment.
Figure 4:
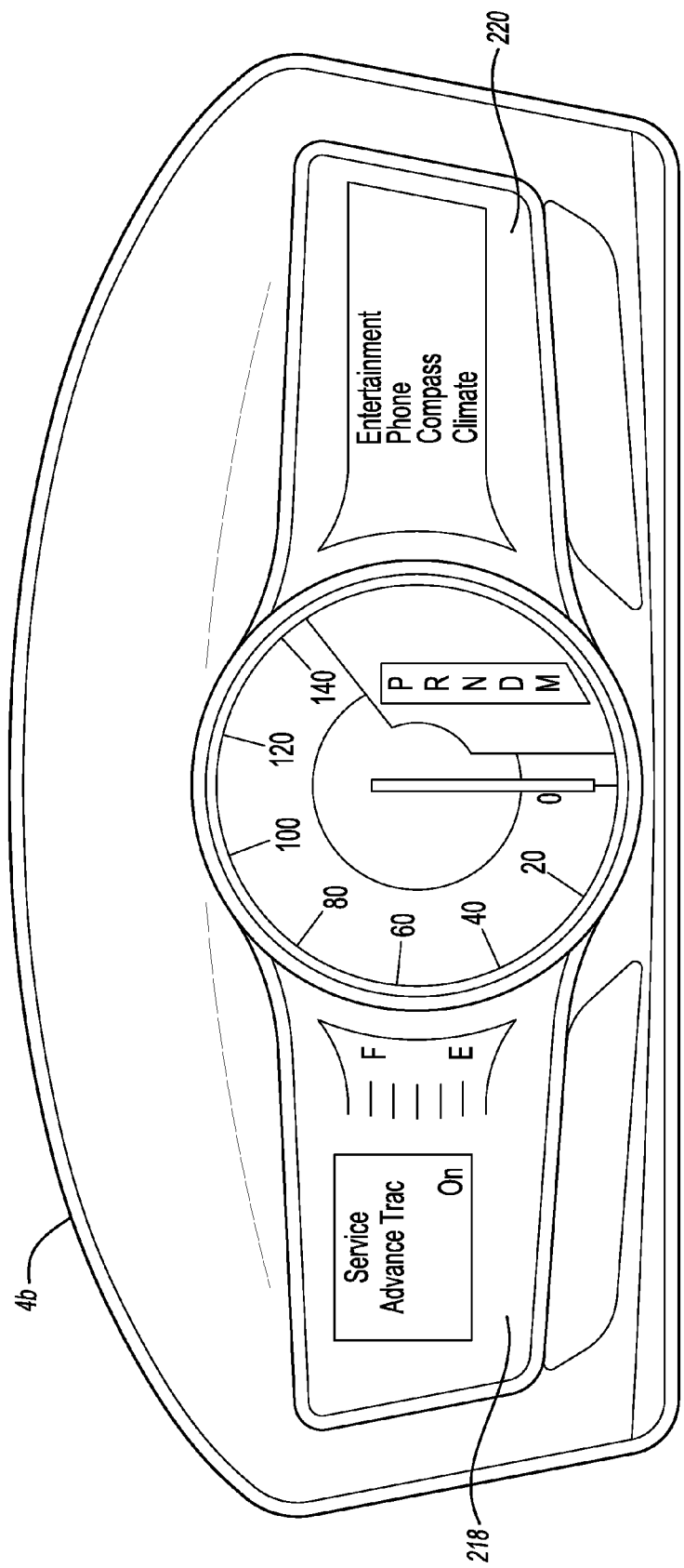
FIG. 4 is an illustration of a another display of the user-interactive information display system according to another embodiment.
Figure 5:
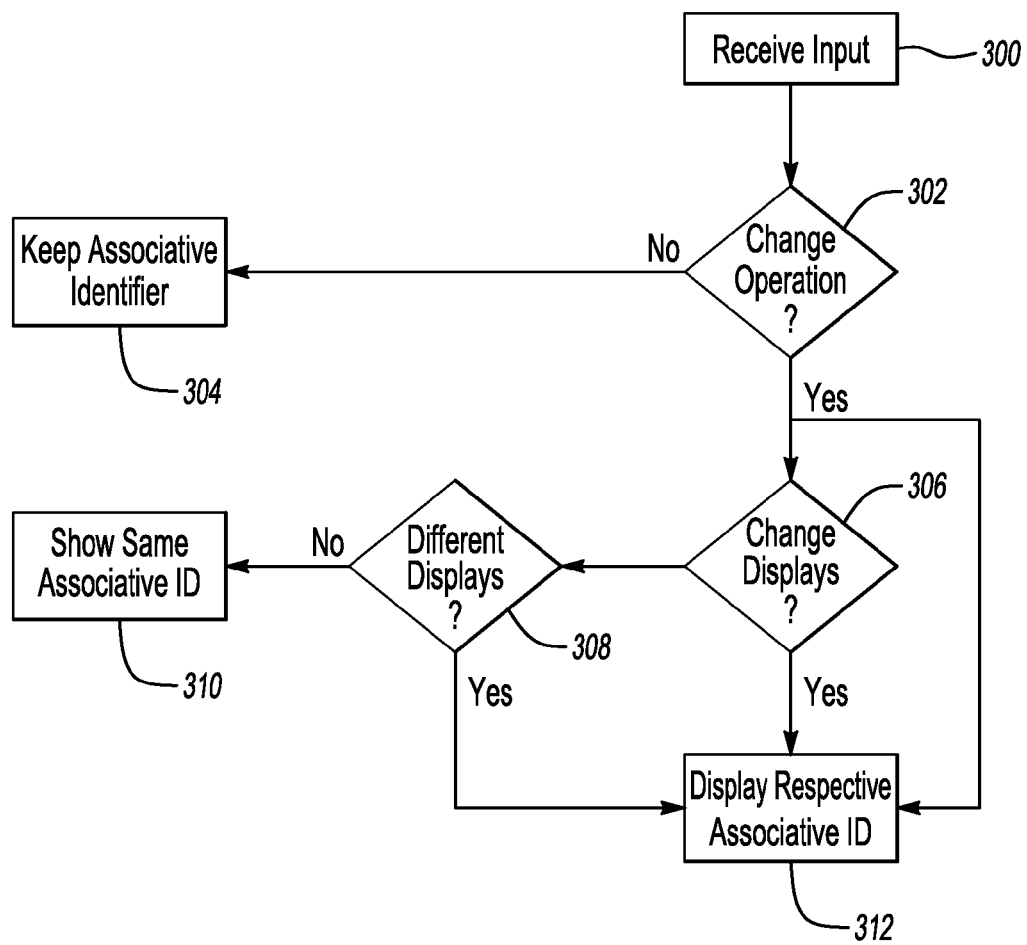
FIG. 5 is a process for user interaction with the user-interactive information display system according to one embodiment.

FIG. 2 illustrates the architecture of a user-interactive display system 100 comprising an information display module 4a, 4b and the VCS 1 within the vehicle 31. The displays 4a, 4b may be disposed on the center stack, in the instrument panel (IP) and elsewhere. Without limiting the foregoing, and for purposes of illustration and clarity, the center stack module will be referenced as 4a and the IP display will be referenced as 4b. These displays may be programmed with a graphical user interface (GUI) through which a vehicle occupant interfaces with the VCS 1. FIGS. 3 and 4 provide exemplary illustrations of such displays. These figures will be described in further detail below.

The display modules 4a, 4b and the VCS 1 may exchange various signals including, but not limited to, video signals, color information, video clocks, synchronization signals, and enable signals. In some embodiments, at least one display 4a, 4b may be a touchscreen display. However, display 4a, 4b may be flexible to support touch screen and non-touch screen displays. In these instances, the touchscreen display may also exchange touch coordinates and signals with the VCS 1. Exchange of these signals may occur during user interaction with the VCS 1 from at least one of displays 4a, 4b. The VCS 1 and the displays 4a, 4b may communicate with each other via a common board to board connector or data bus interface.

An audio module 26 may receive input signals from the VCS 1 and output audio signals to the VCS 1. The audio signals may be output to speakers 13 via the VCS 1. The vehicle 31 may be outfitted with a satellite radio system such as SIRIUS RADIO or XM RADIO. Accordingly, satellite radio signals may also be exchanged between the audio module 26 and the VCS 1.

Instructions and commands by the vehicle occupant from the VCS 1 to vehicle control modules 80 may be exchanged via one or more vehicle networks 84, 86, 88. Additionally, the infotainment vehicle network 84 (e.g., and without limitation, CAN) may communicate instructions/commands to an IP cluster 82 of the vehicle. It should be understood that the vehicle networks may be medium-speed (MS) and/or high-speed (HS) depending on the particular configuration of the system.

Using the user-interactive vehicle information display system 100, a vehicle occupant may operate a number of different vehicle-based functions. For example, a connected (e.g., paired) phone may be accessed from the vehicle information display system, e.g., for enabling hands free call operation, accessing contacts (i.e., a "phonebook"), call log, speed dialing, and the like. In some embodiments, accessing contacts may include browsing phonebook contacts through a 3D carousel phone book photo browser. The system 100 may also enable the receipt, playback and transmission of text based messages including, but not limited to, SMS and MMS. Another function that may be operated from the system may include a vehicle climate system (which will be described in further detail with respect to FIG. 3).

A vehicle entertainment system may also be accessed and operated. This may include operation of a FM/AM radio, satellite radio, CD, USB stick input, and browse albums that may stored in memory. Further, a vehicle occupant may browse through all connected media devices without having to change audio sources. In some embodiments, the entertainment operation may enable browsing albums using a 3D carousel browser.

An additional operation that may be operated includes a vehicle navigation system.

As briefly described above, the vehicle information display system may include touch screen capability, including a number of preset operations activated and operated from the touch screen display. The display may include multiple preset buttons or touch points accessible from one or more of the corners or other locations of the display (e.g., the center stack display). In one embodiment, the display includes four preset buttons or touch points accessible from the four corners of the display.

Each corner may include or make reference to a different operation. For example, and without limitation, the top left corner may operate a connected phone (i.e., a communication operation), the bottom left corner may provide access to the entertainment system of the vehicle, the top right corner may provide access to the navigation system, and the bottom right corner may be a climate control input. These input controls may be placed in each respective corner even while the user browses through various pages of the system 100. In this way, a driver may toggle from one operation to another without the need to look at the display at any point while interfacing with the VCS 1 via the display module 4a.

In one embodiment, the operations may be displayed such that the user may access any one or more of the "core" operations regardless of a current displayed sub-operation (i.e., any operation within the "core" operations) the user is operating. For example, a sub-operation with the entertainment operation (described below) may include the ability to "tag" songs from the vehicle computing system. Tagging information may be transmitted to a third party entity (e.g., a media website) to purchase the song from the third-party. The tagged song may be transmitted over a wireless connection (such as an in-cabin WiFi connection). In other embodiments, the location of the "core" operations may be customizable as will be described below.

In one embodiment, as shown in FIG. 3, the display 4a may be configured with a bezel 200 framed around it. Using this bezel 200 as a guide around the screen 202 of the display module 4a, a driver or vehicle occupant may be tactilly guided (e.g. using his or her fingers) to the various functions/operations (e.g., one or more corners) of the four corners of the display. In this fashion, the user may do so without looking at the display module 4a. The bezel 200 may be elevated from the screen 202 or include other tactically distinguishable features for locating the various functions/operations of the vehicle. Non-limiting examples may include notches, raised points along the bezel, and other like indicia. Further, in some embodiments, the screen 202 may additionally or alternatively include tactile indicia itself.

FIG. 3 illustrates, as an example, four operations enabled from the system 100 in each corner of the display 4a. In this example, the operations include a phone operation 206, a navigation operation 208, an entertainment operation 210, and a climate operation 212. Each operation may be associated with a graphical or textual identifier that identifies the operation. In some embodiments, the selection of each operation may trigger the activation of the associative identifier for each operation. A non-limiting example of such an associative identifier may include various colors. For example, the color red may be associated with entertainment, the color blue may be associated with climate, the color green may be associated with navigation, and the color yellow may be associated with the phone operation. It will be appreciated that other identifiers may include text as illustrated in FIG. 3. It should be understood that these associative identifiers are non-limiting and others may be used without departing from the scope of the invention. Additionally, the color schema may be modified according to the specific implementation utilized. Further, the arrangement and specific location of the operations should not be considered limiting and may be re-arranged according to the specific implementation utilized.

The position of each operation may be related to positioning the operation according to those that are most commonly used by the driver or vehicle occupant. In this example, phone 206 and navigation 210 are positioned at the top. Further, vehicle functions may be positioned closer to particular vehicle controls. In this example, the entertainment operation 210 is placed closer to the audio controls. Accordingly, the position of the functions may enable the vehicle occupant to easily operate each function.

A graphical input 214 (represented in FIG. 3 as a house) may be used as a shortcut to various functions of the system 100. Upon selection of the graphical input 214, a sub display 216 may be displayed. The sub-display 216 may be displayed in various ways including, but not limited to, as a "pop up" or by "sliding" up from the bottom of the display 4a.

In some embodiments, the display 4a may further associate certain sub-operations (i.e., operations within the "core" operations) with an input identifier identifying the type of input that may be used to activate sub-operation. The input identifier may be a color, a graphic, or other like identifier. For example, if the driver is in the entertainment operation 210, the driver may be presented with option to choose AM/FM radio, satellite radio, CD player, and the like. Each sub-operation may be highlighted, boxed, framed, or circled with a certain color, e.g. blue, to identify that the driver may only use a tactile input to operate the function. Alternatively, the input identifier may be red to identify that the driver may only use a verbal input. Additionally or alternatively, a graphic may be positioned next to each operation. It will be appreciated that the characteristics of the input identifiers are non-limiting. Others may be used without departing from the scope of the invention.

A user may also clear all and/or zoom particular information on the display 4a, 4b with tactile and/or voice input. With this input, the entire display can be cleared. Additionally or alternatively, only particular information may be displayed. Additionally or alternatively, particular information may be zoomed in/zoomed out. As an example, only the navigation map may be displayed on display 4a.

In one embodiment, aspects of the operations (and information associated with the operations) displayed in the center stack display (FIG. 3) may also be displayed in the instrument panel display (FIG. 4). FIG. 4 illustrates an exemplary configuration of the IP display 4b. However, it will be appreciated that the arrangement of FIG. 4 is non-limiting and may be modified to fit the particular implementation utilized. In one embodiment, the IP display 4b may comprise multiple displays (e.g. two displays). For example, the IP display may comprise two 4.2" graphical displays. Different information may be displayed on each IP display 4b. For example, and without limitation, the operation information may be displayed on the left side while the right display may show vehicle related information such as fuel economy, mechanical status, and safety features. It will be appreciated that the size and arrangement of the IP display is not limiting and can be modified without departing from the scope of the invention.

The information displayed on the IP display(s) 4b can be programmatically congruent with or otherwise related to the information displayed on the center stack display 4a. This may include the associative identifier (e.g., the colors) associated with each operation. For example, if the user selects the navigation operation 208 (FIG. 3) from the display 4a, which may have the color green as its associative identifier, the display 4b may be synchronized to also show green (e.g., and without limitation, in the background) as navigation-related information is displayed. The associative identifier may be displayed in the forefront and/or background of the displays 4a, 4b. As one non-limiting example, the text associated with each operation may be displayed with the associative identifier color. As another non-limiting example, if the display includes one or more "tabs" (as shown in a non-limiting illustration in FIG. 3), each tab may be displayed with a color. As another non-limiting example, the background may be colored with the respective associative identifier colors. In some embodiments, if the display is graphically divided for the respective operations (e.g., and without limitation, dividing into quadrants), the background of each division may be colored with the associative identifier.

However, different information may also be displayed on both displays. For example, entertainment information may be displayed on the center stack display 4a while navigation information is displayed on the instrument panel display(s) 4b. In this case, each display 4a, 4b may display the respective associative identifier associated with the operation being displayed. Using the above example, the color red, which may be associated with the entertainment operation 210, may be displayed on the display 4a while green, which may be associated with the navigation operation 208, may be displayed on the IP display 4b. In one embodiment, multiple colors may be displayed. For example, red and green may be shown on the displays 4a, 4b to signify that different operation are being displayed on the different displays.

In one embodiment, the color may also be shown through the backlighting of the center stack audio/climate controls and/or vehicle LED lighting. For example, if the user selects the climate operation 210, a blue light may be emitted through a control knob (which may be made of a transparent or opaque material to permit the light to be seen by the vehicle occupant). When the vehicle occupant change the operation (e.g., to entertainment), the light may be red. This may reduce the number of knobs and/or buttons necessary for vehicle function control.

Using one or more input controls in the vehicle, the driver may control the displays 4a, 4b (including, but not limited to, the configuration of the displays) and/or manipulate the information displayed on the center stack display 4a, the instrument panel display 4b, or both. For example, the steering wheel (not shown) may be configured with one or more controls. In one embodiment, this control may be a five-way controller. Additionally or alternatively, voice commands may be used. In one embodiment, the display configurations may be stored in memory of the VCS 1 and/or on an external device (such as a USB drive) that is input to the VCS 1. The vehicle controls may be used to obtain the stored setting and to accordingly configure the displays.

In some embodiments, the steering wheel may be configured with gear shift controls for controlling manual transmission operation of the vehicle. The displays 4a, 4b may also change in response to the operation of the gear shift paddles.

FIG. 6 illustrates an exemplary process of the interaction between the displays 4a, 4b. An input may be received (block 300) from at least one of the display(s) 4a, 4b and/or a vehicle control in response to a user input. If the input is not a "core" operation change (block 302), e.g., a control of a sub-operation, then the associative identifier for the respective displays 4a, 4b may be displayed (block 304). In some cases, the displays 4a, 4b may show the same or different associative identifiers (e.g., colors).

If there is a change in the "core" operations (block 302), the respective associative identifiers may be displayed (block 312). Additionally, a further determination may be made if a request to change which "core" operation is on the displays 4a, 4b is received (block 306). If there is no request, a further determination may be made if the displays 4a, 4b already display different "core" operations (block 308). If not, then the same color may be used for all displays (block 310). If the displays do show different "core" operations, the respective associative identifiers may be displayed (block 312).

The displays 4a, 4b may be personalized/customized according to the preference of a driver and/or other vehicle occupant. These preferences may be stored in vehicle memory (e.g., on the VCS 1) and/or stored on an external device that is input to the VCS 1 (e.g., a USB drive or vehicle keys). The configuration of the system 100 personalized for the vehicle occupant can be activated using a tactile command (e.g., a physical button press and/or a press of a graphical input on the touchscreen display) and/or a voice command. Each user can store configuration settings in a user profile. The user profiles may be created, e.g., on a portal hosted by the OEM. An example is www.syncmyride.com hosted by THE FORD MOTOR COMPANY.

A vehicle occupant may personalize the displays 4a, 4b. For example, if there are multiple drivers for a single vehicle, one driver may personalize the displays 4a, 4b such that entertainment information is displayed on display 4a and navigation information is showing on display 4b. The other driver may have a different configuration. A vehicle occupant may also personalize the specific information displayed on each display 4a, 4b. For example, a driver may only want to see the "core" operations on the display (e.g., in one or more corners) and the balance of the display as a personalized "wallpaper." The wallpaper, which may be provided by the OEM and/or uploaded by the driver, may be stored in memory of the VCS 1. Additionally or alternatively, the driver may configure the position of the operations and/or the graphical inputs on the display.

The vehicle occupants may also personalize the individual displays of the display(s) 4b. For example, and without limitation, the operations may be displayed on the right side (rather than the left as shown as an example in FIG. 4). As another example, a driver may configure the display 4b to show only particular information. As example, the user may only desire to have the gas gauge and the odometer showing.

A vehicle occupant may also personalize climate control. For example, a single touch activation from the display 4a (e.g., graphical input 218 in FIG. 3) may enable personalized climate settings for different drivers of the vehicle.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A vehicle human machine interface (HMI) comprising:
   a first graphical display including a touch-screen;
   a second graphical display;
   a plurality of input controls; and
   a vehicle computer, communicating with the first and second graphical displays, configured to:
      receive user input defining user instructions for controlling one or more vehicle functions; and
      responsive to the input, present, on the first and second graphical displays, a vehicle function identifier color, associated with the vehicle function, the first display including four corners, each displaying a different vehicle function and associated identifier color.

2. The vehicle HMI of claim 1 wherein the first graphical display and the second graphical display are configured to display a different vehicle function identifier color.

3. The vehicle HMI of claim 1 wherein the vehicle computer presents the vehicle function identifier color on the first or second graphical display in response to the user input.

4. The vehicle HMI of claim 1 wherein at least one vehicle function is an in-vehicle climate control function.

5. The vehicle HMI of claim 4 wherein the vehicle computer is further configured to store one or more configured climate control settings, wherein the climate control function further includes an input control for enabling the configured climate control settings.

6. The vehicle HMI of claim 1 wherein the first graphical display includes a bezel defining a boundary for receiving the user input at the touchscreen.

7. A method for operating one or more functions of a vehicle, the method comprising:
   receiving a first input defining user instructions for controlling one or more functions of a vehicle, the input being received from one or more touchscreen inputs on a first graphical display, located in proximity to one or more corners of the first graphical display;
   receiving a second input from a second input device, the second input defining information to display on a second graphical display, wherein the first or second displays include four corners, each corner having a touchscreen input corresponding to a different category of vehicle functions and an associated identifier color;
   in response to the first input, presenting on the first graphical display a first vehicle function identifier color associated with the vehicle function; and
   in response to the second input, presenting on the second graphical display, a second vehicle function identifier color associated with the displayed information.

8. The method of claim 7 wherein the first and second vehicle function identifier colors are the same color.

9. The method of claim 7 wherein the categories include communication, entertainment, navigation, and climate.

10. The method of claim 7 wherein the second input device is disposed on a vehicle steering wheel.

11. The method of claim 7 wherein the first graphical display includes a bezel.

12. The method of claim 11 further comprising utilizing the bezel for identifying a boundary for the one or more touchscreen inputs.

13. A method comprising:
   associating each of a plurality of vehicle function categories with a different color;
   receiving input from at least one of a plurality of vehicle controls, defining user instructions for controlling a vehicle function within one of the plurality of categories;
   presenting, on two or more vehicle graphical displays, an input-responsive vehicle function identifier color; and
   emitting colored light from one or more vehicle controls corresponding to the presented vehicle function identifier color.

14. The method of claim 13 wherein the graphical display includes a first display, the method further comprising displaying the vehicle function identifier color in proximity to at least one corner of the first display.

15. The method of claim 13 wherein the input control is a voice input control.

16. The method of claim 13 wherein the vehicle controls are audio controls, climate controls, or both.

* * * * *